UNITED STATES PATENT OFFICE.

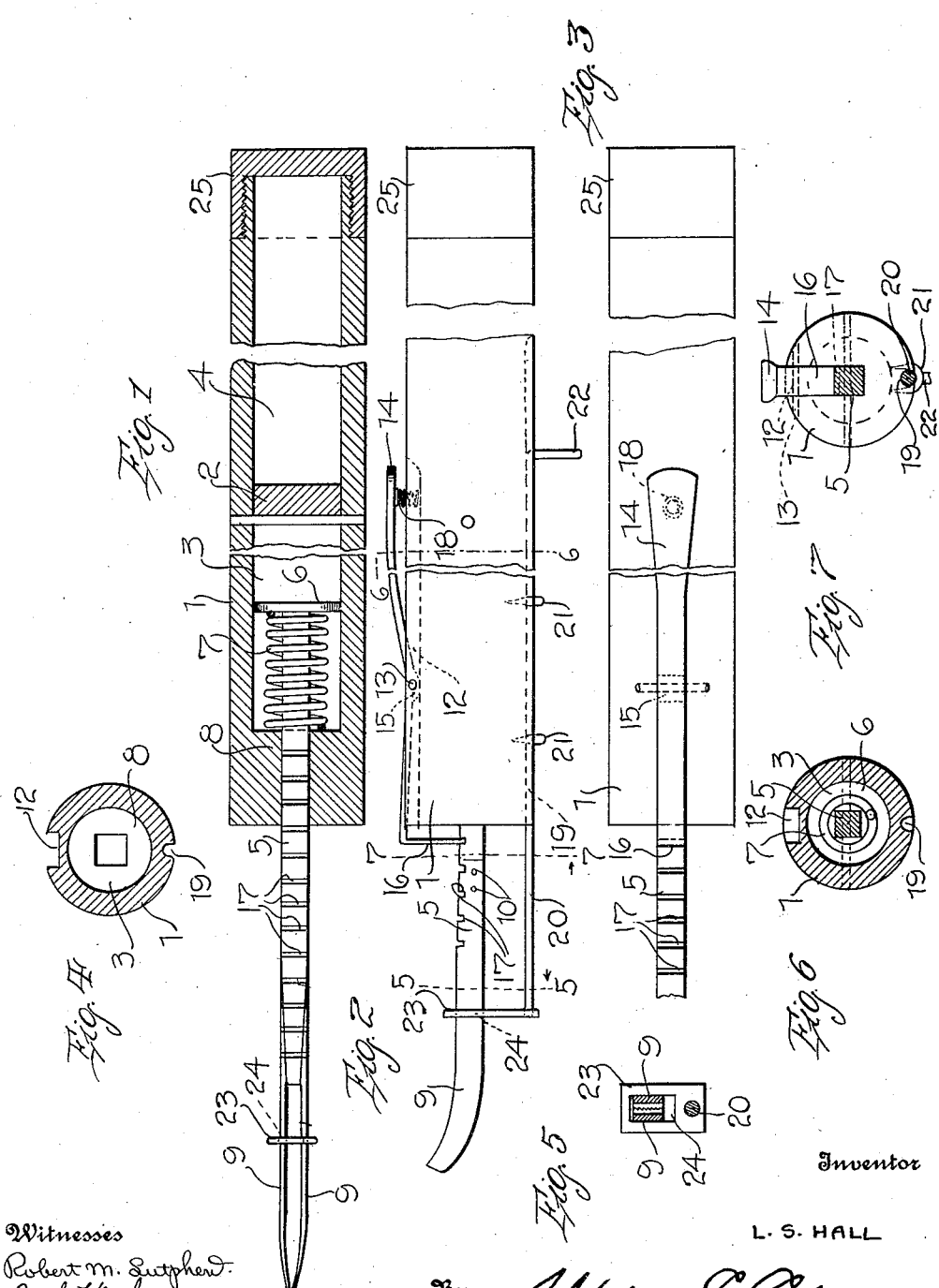

LEWIS S. HALL, OF HATTIEVILLE, ARKANSAS.

DENTAL FORCEPS.

1,082,630.   Specification of Letters Patent.   Patented Dec. 30, 1913.

Application filed July 7, 1913. Serial No. 777,757.

*To all whom it may concern:*

Be it known that I, LEWIS S. HALL, a citizen of the United States, residing at Hattieville, in the county of Conway and State of Arkansas, have invented certain new and useful Improvements in Dental Forceps, of which the following is a specification, reference being had to the accompanying drawings.

This invention relates to improvements in dental forceps, and an object thereof is the provision of a device of this character comprising a handle having a pair of resilient forcep blades secured thereto, the handle also having a blade closer slidably mounted thereon.

Another object of this invention is the provision of dental forceps comprising a handle having a pair of forcep blades slidably connected thereto, and means connected to the handle for maintaining said blades in various adjusted positions from the end of the handle, to grip teeth in different portions of the mouth.

A still further object of this invention is the provision of a device of this character comprising a handle having a shank slidably mounted therein, the shank being provided with a longitudinal series of notches and a pair of resilient forcep blades secured to the outer end of the shank, the handle having a lever pivotally secured thereto and adapted to engage in any one of the notches of the shank to maintain the forcep blades in various adjusted positions.

With these and other objects in view, my invention consists in certain novel constructions, combinations and arrangements of parts, to be hereinafter more fully described, claimed, and illustrated in the accompanying drawing, in which—

Figure 1 is a longitudinal section of the forceps; Fig. 2 is a side elevation thereof; Fig. 3 is a top plan view; Fig. 4 is a transverse section of the handle with all of the parts removed; Fig. 5 is a section on the line 5—5 of Fig. 2 looking in the direction of the arrow; Fig. 6 is a section of the line 6—6 of Fig. 2; and Fig. 7 is a section on the line 7—7 of Fig. 2 looking in the direction of the arrow.

Referring more particularly to the drawing, the numeral 1 designates a hollow handle which is provided intermediate of its ends with a partition wall 2 thereby dividing the bore of the handle into a forward compartment 3, and a rear compartment 4. A shank 5 is slidably disposed in the bore of the handle forwardly of the partition 2, the shank having an enlarged head 6 at its inner end, and a spiral expansion spring 7 is arranged about the shank, one end of the spring resting against the enlarged head 6 and the other end of the spring bearing against an inwardly extending shoulder 8 formed on the handle near its outer end. A pair of resilient forcep blades 9 are secured to the outer end of the shank by rivets 10 or other suitable means, the blades being constructed of resilient metal whereby they are normally spaced apart at their outer ends, the retracting movement of the shank 5 being limited by contact of the head 6 with the partition 2 and the length of such shank 5 is such as to maintain the blades 9 at all times exteriorly of the handle 1. The handle is provided with a longitudinal groove 12 in the walls of which a pin 13 is mounted, and a lever 14 is provided with an apertured ear 15 to receive said pin, whereby the lever is pivotally connected to the handle. The forward end of the lever is offset inwardly, as at 16, to engage over the outer end of the handle, the extremity of the offset portion 16 of the lever being adapted to engage in any one of the longitudinal series of notches 17 formed in one edge of the shank 5. To normally maintain the extremity of the offset portion 16 of the lever in engagement with the shank, I provide a laterally extending expansion spring 18 which bears at one end against the handle and at its opposite end against the inner end of the lever. Another longitudinal groove 19 is formed in the handle at a point opposite the groove 12, in which the blade closing rod 20 is slidably mounted, the rod being maintained in engagement with the groove by loops 21. The lower end of the rod is offset outwardly as at 22, to provide a finger piece whereby the rod may be readily moved and the outer end of the rod is provided with an enlarged head 23 having an aperture 24 through which the blades 9 project.

If desired a plurality of dental tools may be carried in the compartment 4 in the handle, the tools being maintained therein by a cap 25.

In the practical use of my device, the shank is maintained in its innermost position by the engagement of the extremity of the offset portion 16 of the lever with the outermost notch 17 in the shank, and the blades 9 are arranged on the opposite sides of the tooth to be extracted, whereupon the blades are closed by moving the rod 20 outwardly to cause the walls of the aperture 24 in the head of the rod to engage the blades and force them together to grip the tooth. If it is desired to extract one of the jaw teeth, the lever is disengaged from the outermost notch 17, and the shank is moved outwardly to the desired distance, whereupon the lever is again allowed to engage one of the notches, and the blades 9 are then engaged with the tooth which is to be extracted, and it is to be particularly observed that the lever 14 and the rod 20 and more particularly the offset 22 are so positioned as to be readily and conveniently manipulated by the digits of the hand grasping the handle which in a device of this character is of particular advantage.

Having thus fully described my invention what I desire to claim and secure by Letters Patent is:

1. A device of the character described comprising a handle, a shank slidably mounted in said handle, forcep blades secured to the outer end of said shank and adapted to extend longitudinally from said handle, said shank being provided with a longitudinal series of notches, and means secured to said handle to engage the notches in said shank, to secure said shank in adjusted position.

2. A device of the character described comprising a handle, a shank slidably mounted in said handle and projecting therebeyond, a tool secured to the outer end of said shank, means for normally maintaining said shank within said handle, said shank being provided with a longitudinal series of notches, and a lever pivotally secured to said handle and adapted to engage certain of said notches in said projected portion to maintain said shank in adjusted position.

3. A device of the character described comprising a handle, a shank slidably carried by said handle and provided with a series of notches, automatic means for imparting movement to the shank in one direction, and means carried by the handle movable toward and from the shank for engaging certain of the notches thereof to hold the shank in adjusted positions.

4. A device of the character described including a handle, a member slidably mounted in said handle, blades secured to the projected end portion of the member, and a rod slidably connected to said handle and provided with a finger piece, said rod having an apertured head through which the blades are adapted to contact whereby such blades are forced one toward the other upon movement of the rod in one direction.

5. A device of the character described comprising a handle, a shank slidably carried by said handle, normally spaced blades carried by the shank, means carried by the handle to engage the shank to hold the same in adjusted positions, and movable means carried by the handle engageable with the blades whereby such blades are forced in a direction one toward the other, both of such means being so positioned on the handle as to be readily manipulated by the digits of the hand grasping the handle.

In testimony whereof I hereunto affix my signature in the presence of two witnesses.

LEWIS S. HALL.

Witnesses:
LEE CHEEK,
CHARLES KING.

Copies of this patent may be obtained for five cents each, by addressing the "Commissioner of Patents, Washington, D. C."